United States Patent
Eriksen et al.

(10) Patent No.: US 8,061,692 B1
(45) Date of Patent: Nov. 22, 2011

(54) FLOOR ISOLATION SYSTEM

(75) Inventors: Konrad Eriksen, Reno, NV (US);
   Amarnath Kasalanati, Moraga, CA
   (US); Andrew Dorris, Reno, NV (US)

(73) Assignee: DIS Inc., Sparks, NE (US)

( * ) Notice: Subject to any disclaimer, the term of this patent is extended or adjusted under 35 U.S.C. 154(b) by 216 days.

(21) Appl. No.: 11/752,280

(22) Filed: May 22, 2007

(51) Int. Cl.
   *F16M 1/00* (2006.01)
   *F16M 1/06* (2006.01)

(52) U.S. Cl. .................. 267/136; 52/167.6; 248/638

(58) Field of Classification Search .......... 188/378, 188/379, 380; 267/73, 136, 175; 52/167.4, 52/167.5, 167.6, 167.8; 248/585, 638
   See application file for complete search history.

(56) References Cited

U.S. PATENT DOCUMENTS

| | | | |
|---|---|---|---|
| 2,055,000 A * | 9/1936 | Joseph Bacigalupo | 52/167.6 |
| 2,488,080 A | 11/1949 | Edwards | |
| 2,631,819 A * | 3/1953 | Duncan | 441/25 |
| 3,748,800 A * | 7/1973 | Glicksberg | 52/167.4 |
| 4,371,143 A * | 2/1983 | Ishida et al. | 248/638 |
| 4,402,483 A * | 9/1983 | Kurabayashi et al. | 248/636 |
| 4,565,039 A * | 1/1986 | Oguro et al. | 52/167.4 |
| 4,801,122 A | 1/1989 | Stahl | |
| 4,846,090 A | 7/1989 | Palmquist | |
| 5,002,003 A | 3/1991 | Blue | |
| 5,365,872 A | 11/1994 | Obrinski | |
| 5,497,585 A * | 3/1996 | Engler | 52/101 |
| 5,689,919 A * | 11/1997 | Yano | 52/167.6 |
| 5,876,012 A * | 3/1999 | Haga et al. | 248/550 |
| 6,233,884 B1 * | 5/2001 | Tipping et al. | 52/167.1 |
| 6,241,059 B1 * | 6/2001 | Fujita et al. | 188/267 |
| 6,488,118 B1 * | 12/2002 | Corriveau | 182/36 |
| 6,705,625 B2 * | 3/2004 | Holt et al. | 280/47.34 |
| 7,107,728 B2 * | 9/2006 | Whitley | 52/167.4 |
| 7,249,442 B2 * | 7/2007 | Pellegrino et al. | 52/167.8 |
| 2004/0123531 A1 * | 7/2004 | Ferraiolo | 52/167.1 |

FOREIGN PATENT DOCUMENTS

| | | | |
|---|---|---|---|
| FR | 2625523 A1 | | 7/1989 |
| JP | 291354 A | * | 3/1990 |
| JP | 02091354 A | | 3/1990 |
| JP | 6288073 A | * | 10/1994 |

OTHER PUBLICATIONS

Konrad Eriksen, "Multidirectinal Spring Unit," U.S. Appl. No. 11/752,282, filed May 22, 2007, 9 pages including drawings.

* cited by examiner

*Primary Examiner* — Melody Burch
(74) *Attorney, Agent, or Firm* — Patent Law Group LLP; David C. Hsia

(57) ABSTRACT

A floor isolation system includes a platform and a multidirectional spring unit. The platform has rolling supports that isolate the platform from lateral movements of a substrate. The platform further has sliding supports that (1) prevent the platform from moving freely during daily service and (2) dampen lateral movements of the platform caused by the lateral movements of the substrate. The multidirectional spring unit links the substrate and the platform to provide a spring force in any horizontal direction that limits the lateral displacements of the platform. The multidirectional spring unit includes a spring secured to the substrate, a fairlead, and a cable having one end secured to the spring and another end passing through the fairlead and secured to the platform.

19 Claims, 4 Drawing Sheets

FLOOR ISOLATION SYSTEM

CROSS-REFERENCE TO RELATED APPLICATION

This application is related to U.S. patent application Ser. No. 11/752,282 entitled "Multidirectional Spring Unit," which is concurrently filed and commonly assigned, and has the same inventorship hereof.

FIELD OF INVENTION

This invention relates to a system that protects against excessive forces and accelerations, such as those caused by earthquakes.

DESCRIPTION OF RELATED ART

A building designed to meet current international building codes will only provide "Life Safety" in earthquakes. This means that the building does not collapse and the occupants can exit the building after an earthquake. However, the building may not provide adequate protection for its contents, such as expensive computers and semiconductor manufacturing equipment. Currently the contents of a building are either freestanding or they are anchored to the floor. If the contents are freestanding, they will be thrown about the building due to floor accelerations caused by an Earthquake. If the contents are anchored to the floor, they will still experience very high accelerations that will damage them. Thus, a system is needed that protects the contents of a building during an earthquake.

SUMMARY

In one embodiment, a floor isolation system includes a platform and a multidirectional spring unit. The platform has rolling supports that isolate the platform from the lateral movements of a substrate on which the platform rests. The platform further has sliding supports that (1) prevent the platform from moving freely during daily service and (2) dampen lateral movements of the platform caused by the lateral movements of the substrate. The multidirectional spring unit links the substrate and the platform to limit the lateral displacements of the platform along any lateral direction.

In one embodiment, the multidirectional spring unit includes a spring secured to the substrate, a fairlead, and a cable having one end secured to the spring and another end passing through the fairlead and secured to the platform.

DETAILED DESCRIPTION OF THE DRAWINGS

Use of the same reference numbers in different figures indicates similar or identical elements.

DETAILED DESCRIPTION OF THE INVENTION

A floor isolation system is provided to protect an item against excessive forces and accelerations, such as those experienced in earthquakes. The item may be equipment or structures placed or constructed on a platform. The platform rests on a substrate. The substrate may be a building floor, the ground, or any other surface on which the system is installed. The platform is decoupled from the substrate to prevent transmission of excessive forces and accelerations from the substrate to the item on the platform.

In one embodiment, the platform has rolling supports with low frictional resistance that allows the platform to be effectively isolated from substrate motions and accelerations. The rolling supports may be casters (i.e., wheels on swivels). In one embodiment, the system includes one or more multidirectional spring units that connect the platform to the substrate. The multidirectional spring units limit lateral displacements of the platform caused by substrate motions. In one embodiment, the platform further has sliding supports that provide damping to the system to attenuate platform motion transferred from the substrate. The sliding supports also prevent the platform from moving freely during daily service. The sliding supports may be legs with frictional sliders.

Figure 1:
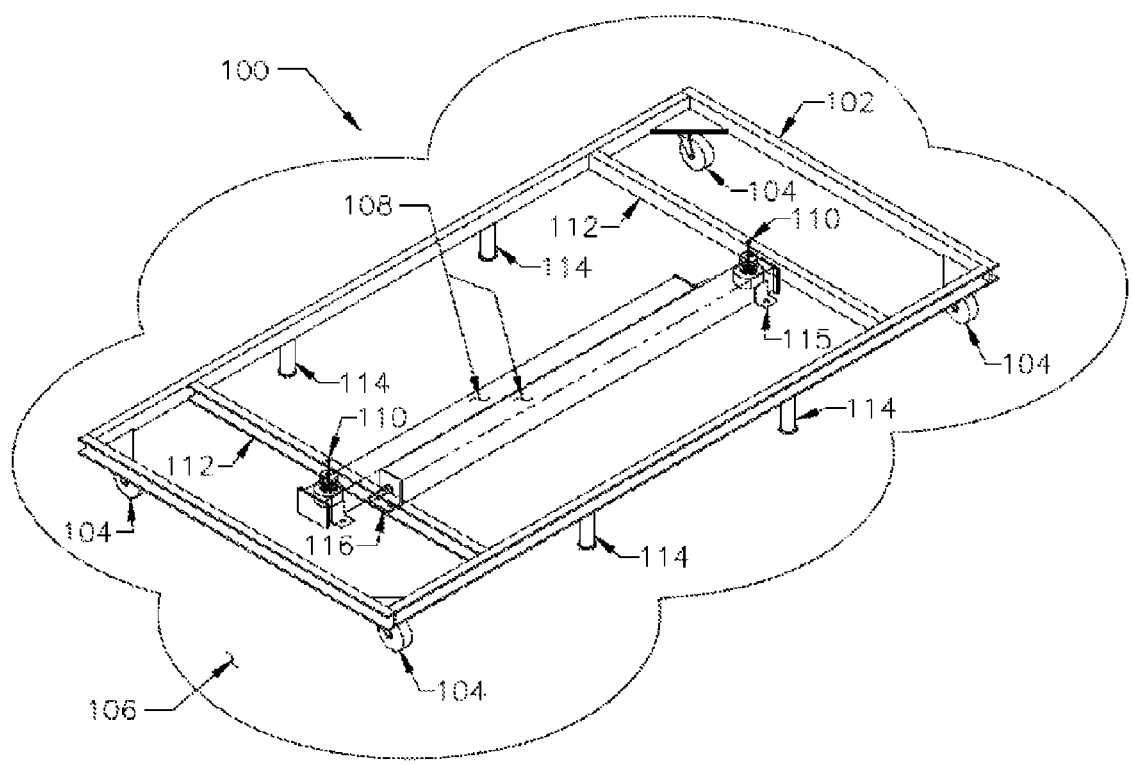
FIG. 1 illustrates a perspective view of a module of a floor isolation system in one embodiment of the invention.

FIG. 1 illustrates a module 100 of a floor isolation system in one embodiment of the invention. Module 100 includes a platform 102. Platform 102 may be any rigid structure. In one embodiment, platform 102 consists of a rectangular frame, cross members, and floor tiles over the frame and the cross members.

Platform 102 has rolling supports 104 that rest on a substrate 106. Rolling supports 104 decouple platform 102 from substrate 106. More specifically, rolling supports 104 have low friction so they offer low resistance that effectively isolates platform 102 from excessive motions of substrate 106. The friction provided by rolling supports 104 may be tailored based on the application. In one embodiment, rolling supports 104 are casters mounted to the four corners of platform 102.

Module 102 also includes a multidirectional spring unit 108 that connects platform 102 to substrate 106. Spring unit 108 provides a resistive force that pulls against it in any direction. Thus, spring unit 108 limits lateral displacements of platform 102 caused by motions transferred from substrate 106. In one embodiment, spring unit 108 is connected by a cable 110 to a cross member 112 of platform 102, and by brackets 115 and 116 to substrate 106. Additional spring units 108 may be added to module 100 to further limit the lateral displacements of platform 102.

Figure 2:
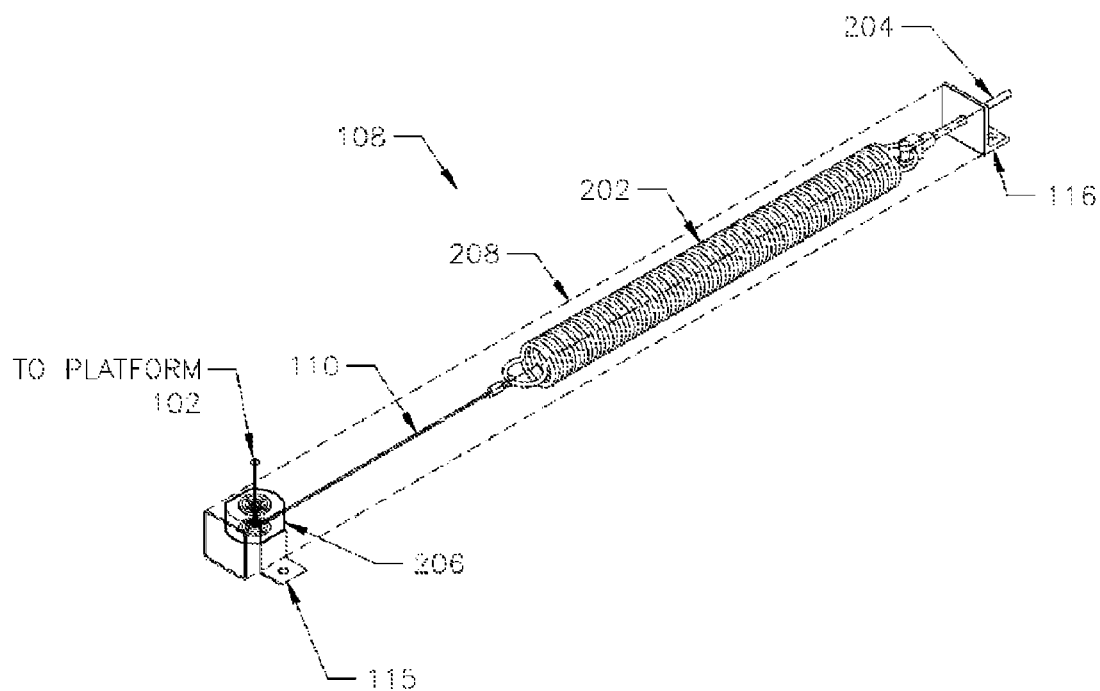
FIG. 2 illustrates a perspective view of a multidirectional spring unit in one embodiment of the invention.

FIG. 2 illustrates the details of a multidirectional spring unit 108 in one embodiment of the invention. Spring unit 108 includes a tension spring 202 having a first end secured to cable 110, and a second end secured to a bracket 116. A pretension device 204 is provided at bracket 116 to preload spring 202 with a desired tension. The spring constant of spring 202 and the preload provided by pretension device 204 are tailored based on the application.

Figure 5:
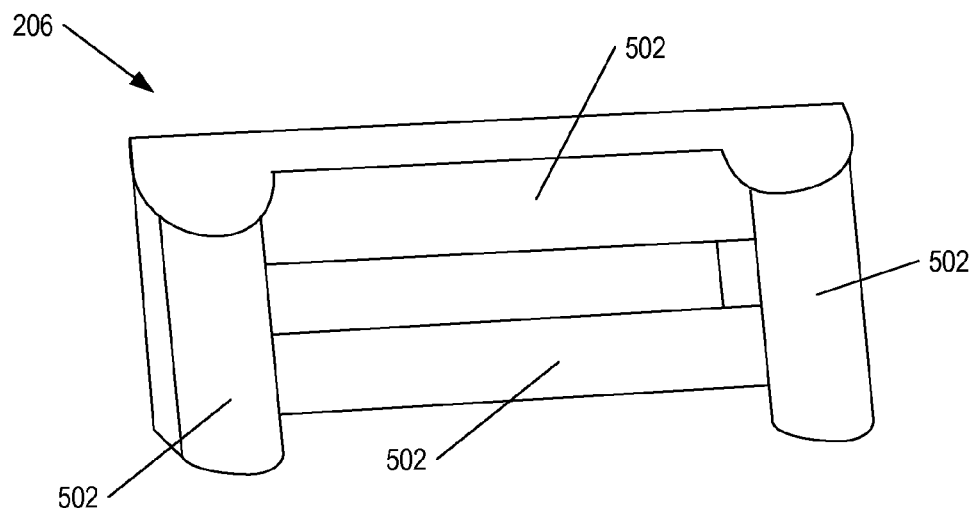
FIG. 5 illustrates a perspective view of a fairlead having multiple rollers in one embodiment of the invention.

Cable 110 exits spring unit 108 through a fairlead 206 and is then secured to platform 102 as shown in FIG. 1. Fairlead 206 is a bushing having rounded top and bottom openings that allow cable 110 to move in any horizontal direction without damage, which in turn allows platform 102 to move in any horizontal direction against tension provided by a spring 202. Alternatively, fairlead 206 consists of multiple rollers 502 that allow cable 110 to move in any horizontal direction without damage as shown in FIG. 5. With fairlead 206, a single spring 202 can provide a resistive force in any direction. However, multiple springs may also be used to provide the resistive force.

In one embodiment, spring unit 108 includes an optional case 208 shown in phantom. Fairlead 206 and brackets 115 are mounted to a first end of case 208 while bracket 116 and pretension device 204 are mounted to a second end of case 208. If spring unit 108 does not have case 208, then fairlead 206 may be mounted by brackets 114 to substrate 106.

Referring back to FIG. 1, platform 102 further has sliding supports 114 that rest on substrate 106. Sliding supports 114 provide the initial resistance to platform movements. This prevents platform 102 from moving freely during daily use. For example, sliding supports 114 prevent small movements of platform 102 caused by foot traffic on platform 102. Sliding supports 114 also provide the damping that attenuates lateral motions of platform 102. The damping provided by sliding supports 114 may be tailored based on the application. In one embodiment, sliding supports 114 are sliders mounted to legs extending from frame of platform 102.

Figure 3:
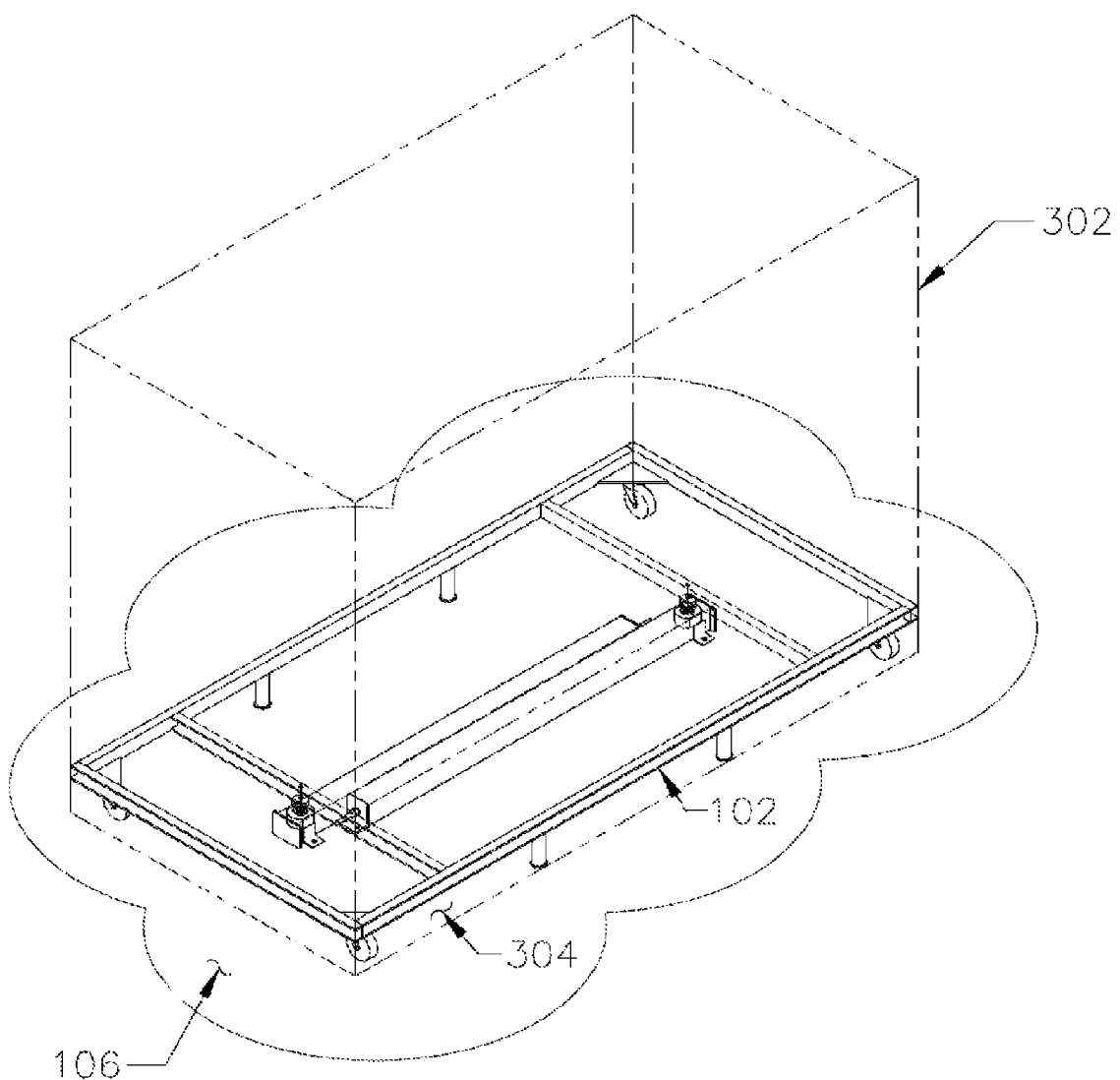
FIG. 3 illustrates a perspective view of the module of FIG. 1 with an item placed or constructed on the module in one embodiment of the invention.

FIG. 3 illustrates a module 100 in use in one embodiment of the invention. An item 302 shown in phantom is placed or constructed on platform 102, which rests on substrate 106. A skirt 304 may be placed around platform 102 to conceal the components of module 100.

Item 302 may be any equipment, such as computer equipment, medical equipment, semiconductor manufacturing equipment, office equipment, or radar equipment. However, item 302 may also be a structure, such as a house or a container of equipment. Typically substrate 106 is a floor of a building or the ground. However, substrate 106 may also be a floor of a transport vehicle, such as a car, a train, an airplane, or a boat.

Figure 4:
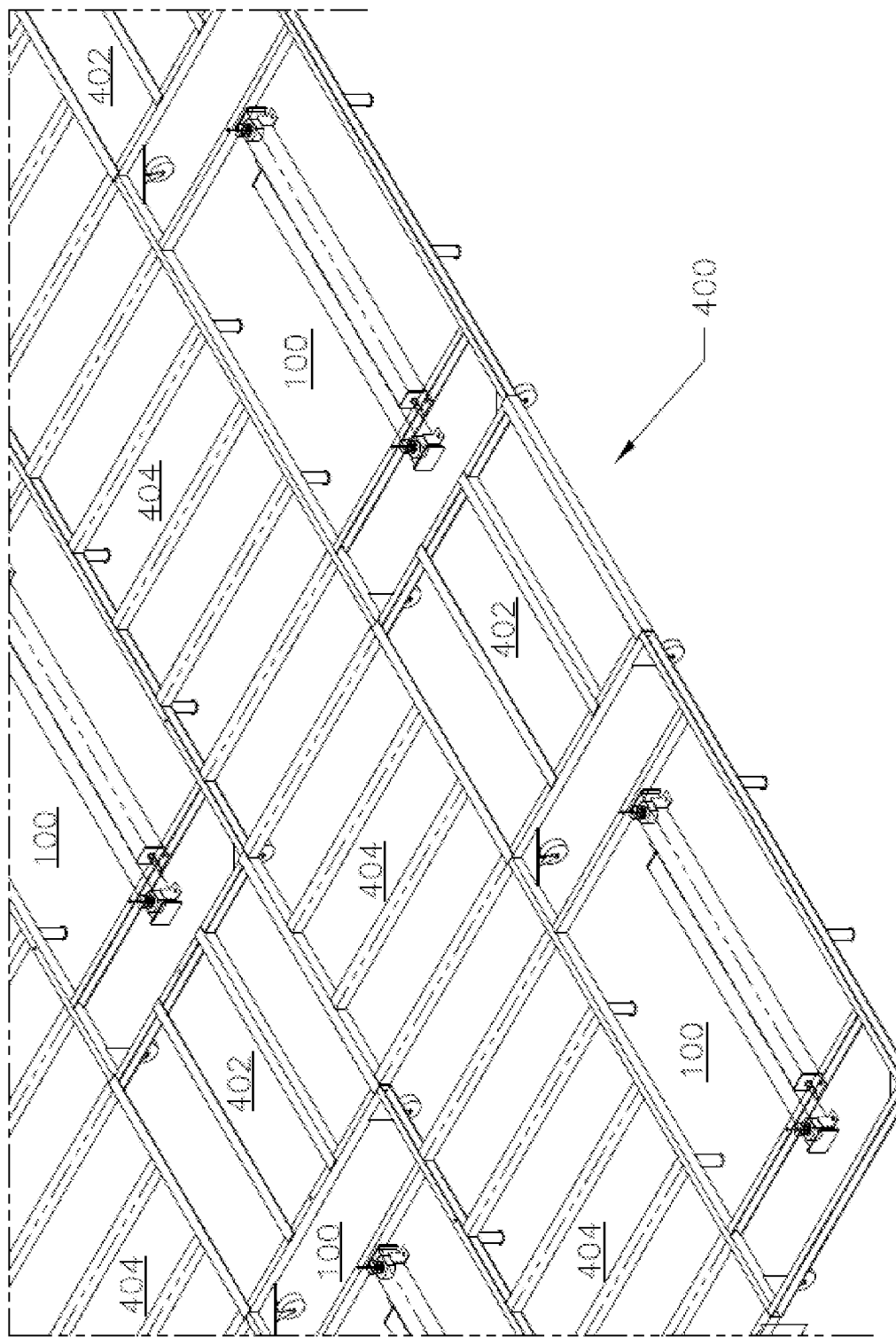
FIG. 4 illustrates a perspective view of multiple modules of the floor isolation system joined by structures spanning between the modules in one embodiment of the invention.

FIG. 4 illustrates a floor isolation system 400 with multiple interconnected modules 100 in one embodiment of the invention. Modules 100 are interconnected by platforms 402 along their shorter sides, and by platforms 404 along their longer sides. Together, they form a large surface for supporting equipment and structures.

Various other adaptations and combinations of features of the embodiments disclosed are within the scope of the invention. For example, although dampening in module 100 is provided by sliding supports 114, multidirectional spring units may be constructed with a damper (e.g., like a shock absorber) as well as spring 202. Numerous embodiments are encompassed by the following claims.

The invention claimed is:

1. A floor isolation system protecting an item against lateral movements of a planar substrate, the system comprising:
a platform for supporting the item;
rolling supports that support the platform above the substrate, the rolling support having a frictional resistance that allows the platform to be effectively isolated from the lateral movements of the substrate in any horizontal direction after installation and during use; and
a multidirectional spring unit located under the platform in a space created by the rolling supports, the multidirectional spring unit comprising:
a stationary case fixedly mounted to a top of the substrate; and
a cable having a first portion lying horizontally inside the stationary case and a second portion extending vertically to exit from the stationary case, an end of the second portion of the cable being secured to a bottom of the platform;
wherein the multidirectional spring unit provides a resistive force against pulls on the cable in any horizontal direction after installation and during use to limit lateral displacements of the platform caused by the lateral movements of the substrate.

2. The system of claim 1, wherein the rolling supports comprise casters.

3. The system of claim 1, wherein the platform further comprises sliding supports that prevent the platform from moving freely during daily service and dampen the lateral displacements of the platform caused by the lateral movements of the substrate.

4. The system of claim 3, wherein the sliding supports comprise legs with sliders.

5. The system of claim 4, wherein the rolling supports comprise casters.

6. The system of claim 1, further comprising:
another multidirectional spring unit comprising another stationary case and another cable, said another stationary case being fixedly mounted to the substrate, and said another cable having one end secured to the platform.

7. The system of claim 1, further comprising:
another platform resting on the substrate;
another multidirectional spring unit comprising another stationary case and another cable, said another stationary case being fixedly mounted to the substrate, and said another cable having one end secured to said another platform; and
a structure connected between the platform and said another platform.

8. The system of claim 1, wherein:
the multidirectional spring unit further comprises:
a spring within the stationary case, the spring having one end coupled to the substrate; and
a fairlead within the stationary case; and
the cable passes through the fairlead, an end of the first portion of the cable being secured to another end of the spring.

9. The system of claim 8, wherein the multidirectional spring unit further comprises a pre-tension device secured to said one end of the spring.

10. The system of claim 8, wherein the fairlead comprises a bushing having top and bottom rounded openings that allow the cable to move in any horizontal direction without damage.

11. The system of claim 8, wherein the fairlead comprises multiple rollers that allow the cable to move in any horizontal direction.

12. The system of claim 8, wherein the platform comprises a frame and a cross member, the rolling supports being located at corners of the frame, and the end of the second portion of the cable being secured to a bottom surface of the cross member.

13. The system of claim 1, further comprising equipment resting on the platform, the equipment being selected from the group consisting of computer equipment, medical equipment, semiconductor manufacturing equipment, office equipment, and radar equipment.

14. The system of claim 1, further comprising a structure resting on the platform, the structure being selected from the group consisting of a house and a container of equipment.

15. The system of claim 1, wherein the substrate is a floor of a building.

16. The system of claim 1, wherein the substrate is ground.

17. The system of claim 1, wherein the substrate is a floor of a transport vehicle.

18. A floor isolation system protecting an item against lateral movements of a planar substrate, the system comprising:
a platform supporting the item, the platform comprising:

a frame structure; and rolling supports that extend down from the frame structure and rest on the substrate, the rolling supports supporting the frame structure above the substrate, the rolling support having a frictional resistance that allows the platform to be effectively isolated from the lateral movements of the substrate in any horizontal direction after installation and during use; and a multidirectional spring unit located under the frame structure in a space created by the rolling support, the multidirectional spring unit comprising:

a stationary case fixedly mounted to a top of the substrate;

a spring within the stationary case, the spring having a first end secured to the stationary case;

a fairlead in the stationary case; and a cable having a first end secured to a second end of the spring, the cable having a second end passing through the fairlead and secured to a bottom of the frame structure;

wherein the multidirectional spring unit provides a resistive force against pulls on the cable in any horizontal direction after installation and during use to limit lateral displacements of the platform caused by the lateral movements of the substrate.

19. A floor isolation system protecting an item against lateral movements of a planar substrate, the system comprising:

a platform comprising a top surface for supporting the item;

rolling supports that support the platform above the substrate, the rolling supports having a frictional resistance that allows the platform to be effectively isolated from the lateral movements of the substrate in any horizontal direction after installation and during use; and a multidirectional spring unit located under the top surface of the platform, the multidirectional spring unit coupling the platform and the substrate, the multidirectional spring unit comprising:

a stationary case;

a fairlead in the stationary case; and a coupling comprising a tension spring and a cable fixed to the tension spring, the coupling having a horizontal portion within the stationary case and a vertical portion that exits the stationary case through the fairlead, the coupling comprising a first end fixed relative to the platform and a second end fixed relative to the substrate;

wherein the multidirectional spring unit provides a resistive force against pulls on the coupling in any horizontal direction after installation and during use to limit lateral displacements of the platform caused by the lateral movements of the substrate.

* * * * *

UNITED STATES PATENT AND TRADEMARK OFFICE
CERTIFICATE OF CORRECTION

PATENT NO. : 8,061,692 B1
APPLICATION NO. : 11/752280
DATED : November 22, 2011
INVENTOR(S) : Konrad Eriksen, Amarnath Kasalanati and Andrew Dorris It is certified that error appears in the above-identified patent and that said Letters Patent is hereby corrected as shown below:

ON THE TITLE PAGE:
Item (73), please change the Assignee "DIS Inc., Sparks, NE (US)" to read:
--DIS Inc., Sparks, NV (US)--.

Signed and Sealed this
Tenth Day of April, 2012

David J. Kappos
*Director of the United States Patent and Trademark Office*